(12) United States Patent
Haulsey

(10) Patent No.: US 7,963,738 B1
(45) Date of Patent: Jun. 21, 2011

(54) VEHICLE TRAILER APPARATUS

(76) Inventor: David M. Haulsey, Hillsville, VA (US)

( * ) Notice: Subject to any disclaimer, the term of this patent is extended or adjusted under 35 U.S.C. 154(b) by 555 days.

(21) Appl. No.: 12/122,090

(22) Filed: May 16, 2008

(51) Int. Cl.
*B60P 1/28* (2006.01)

(52) U.S. Cl. ........................................ 414/480; 414/482

(58) Field of Classification Search .................. 414/480, 414/482, 483
See application file for complete search history.

(56) References Cited

U.S. PATENT DOCUMENTS

| | | | |
|---|---|---|---|
| 76,856 A * | 4/1868 | Warren et al. .................. | 414/485 |
| 3,602,384 A | 8/1971 | Warren | |
| 3,698,582 A | 10/1972 | Weinmann | |
| 4,305,694 A * | 12/1981 | Chan ............................ | 414/482 |
| 5,490,754 A | 2/1996 | Voelzke | |
| D376,336 S | 12/1996 | Unruh | |
| 5,924,836 A * | 7/1999 | Kelly ............................ | 414/482 |
| 6,149,369 A * | 11/2000 | Reed .............................. | 414/480 |
| 6,224,082 B1 | 5/2001 | Landoll et al. | |
| 6,394,734 B1 * | 5/2002 | Landoll et al. ................ | 414/480 |
| 6,537,014 B1 * | 3/2003 | Ridgdill ........................ | 414/482 |
| 6,589,005 B1 | 7/2003 | Hull | |
| 7,658,587 B1 * | 2/2010 | Dierks et al. .................. | 414/484 |

* cited by examiner

*Primary Examiner* — Charles A Fox
(74) *Attorney, Agent, or Firm* — Crossley Patent Law; Mark A Crossley

(57) ABSTRACT

A vehicle trailer apparatus for carrying vehicles and other objects has a front bed having a frame of spaced apart frame rails connected by at least one transverse support, a front bed platform over at least a part of the front bed, a tongue with hitch affixed to the front bed frame, at least two spaced apart wheels affixed to the frame via an axle, a rear tilt bed, having a plurality of spaced apart bed rails, hingedly attached to the front bed, a bed platform over at least a part of the tilt bed, the tilt bed selectively pivoted in incline or decline relative to the front bed to at least about a 40 degree angle, whereby adjacent positions of the front bed rear edge, the sleeve of the hinge, and the tilt bed platform front edge are retained in incline and decline of the tilt bed.

3 Claims, 7 Drawing Sheets

VEHICLE TRAILER APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Tilt bed trailers and tilt bed vehicles are well known in the art and are highly desirable in loading and unloading vehicles and other items. The various types commonly known include rollback trucks, often seen used in towing automobiles, which are known as useful but expensive. Tilt bed trailers include those which feature tilt between the tongue and bed. Tilt bed trailers also include those with a totally separate bed platform which swings downwardly from a separate wheel frame to lower the rear of the platform toward a ground or other surface. Any form of tilt bed is recognized for the ease provided in loading and unloading vehicles of almost any sort, such as snowmobiles, motorcycles, race cars, tractors, ATV's, and a host of others. Without tilt bed capability, ramps or some other means of accessing the trailer bed height must be acquired.

Of further significance is that some previously provided solutions to loading vehicles from a lower surface to the elevated trailer include ramps or other devices which hingedly lower. An issue with some such devices is that a gap exists between the interface of the ramp with that of the main bed of the trailer, a gap progressively magnified with the distant between lower surface and trailer bed. As wheels and other parts of the vehicle being loaded encounter the gap, loading difficulties increase. Wheels and other parts of the vehicle being loaded are easily lodged in the gap, requiring ever increasing forces to successfully load any vehicle.

Yet another problem exists in prior art with tilt bed trailers which unhook, in some way, the tongue or towing means from the bed and then allow the bed front to be accessed for loading a vehicle. This is an involved process and one which requires sufficient space to unhook, move the towing vehicle and towing means, load the vehicle to be conveyed, then reverse the procedure.

Two additional significant problems exist with the forms of tilt beds previously provided. The first is expense. The second is that beds previously provided only tilt downwardly, then back to a level or substantially level position. The first problem is self-explanatory; any time expense is involved, the number or buyers and users declines. The second problem prevents loading and unloading of vehicles from a position higher than the trailer bed. For example, if a vehicle is on an elevated surface, how can it safely and efficiently be loaded onto the trailer? Solutions are typically complicated, require additional equipment, and are often dangerous.

Associated with the second problem is the fact that the previously provided tilt bed trucks and trailers do not provide for dual function, that is, maintenance access to the underside of a vehicle is denied. A vehicle must therefore be serviced in some way prior to loading onto such tilt beds or rollbacks. It is easily understood that repeated loading and unloading of any vehicle for service is not convenient and time efficient. Additionally, the expenses involved are essentially two-fold. Some form of trailer must be provided, and some form of lift must be provided. A race car provides an excellent example. The car is loaded onto a trailer or truck, whether tilt bed or rollback or other form. The car is transported to a track, where it is unloaded for competition, testing, or other purpose. Should any service be required, which is almost certain with such a vehicle, the same car must often somehow be lifted for underside access. If service is successful, the car is lowered. If service is unsuccessful, the car must then somehow be put back on the trailer, without its own power, which is at best difficult and at worst usually dangerous.

The present vehicle trailer apparatus provides a solution to all of the above-listed problems, along with further benefits and safety features.

FIELD OF THE INVENTION

The vehicle trailer apparatus relates to tilt bed and articulated bed vehicles and more especially to a trailer with a hinged tilt bed which articulates with regard to the front bed, without a gap, and provides tilt bed incline and decline relative to the front bed.

SUMMARY OF THE INVENTION

The general purpose of the vehicle trailer apparatus, described subsequently in greater detail, is to provide a vehicle trailer apparatus which has many novel features that result in an improved vehicle trailer apparatus which is not anticipated, rendered obvious, suggested, or even implied by prior art, either alone or in combination thereof.

To attain this, the vehicle trailer apparatus combines the advantages of a trailer and a tilt bed vehicle. The apparatus has a rear tilt bed hingedly attached to the front bed. By combining the two beds, considerable expense is negated as a user need not be exposed to the expense of a tilt bed vehicle but can still enjoy the advantages of such and more to be noted and those of a more typical trailer. The tilt bed inclines and declines, thereby offering vehicle or object loading and unloading from either a higher or lower surface. Further, the present apparatus provides rear tilt bed incline and decline without an elevation change between the front bed platform rear edge and rear tilt bed platform front edge. Further, the present apparatus optionally provides an opening, or openings, or even a ramp design in the tilt bed platform, which grants access to the underside of a loaded vehicle. The apparatus further optionally provides front bed platform openings, cutouts or ramp design. Depending upon the optional platforms, access to the underside of the front and the rear of a vehicle is gained, thereby providing for maintenance or other access need.

Further advantages of the present apparatus include hydraulic operation of the tilt bed and a safety latch which supports the tilt bed, in addition to the hydraulics. Additionally, the design of the hinge and hydraulics enables significant pivotal incline and decline of the tilt bed. Of note is that the apparatus is also provided in embodiments wherein tilt bed incline and decline is operated mechanically and electrically. While ultimate incline and decline is partially determined by trailer size and load considerations, the design elements of the present apparatus allow a minimum of about 40 degrees of tilt bed incline and decline. The combined advantages of the present apparatus therefore provide significant cost advantages over other towing vehicles and vehicle access tools and lifts. The apparatus serves as a trailer, a tilt bed, a lift, a jack for either end of a vehicle, a ramp for loading and unloading any item, and further provides for other imaginable uses.

Thus has been broadly outlined the more important features of the improved vehicle trailer apparatus so that the detailed description thereof that follows may be better understood and in order that the present contribution to the art may be better appreciated.

An object of the vehicle trailer apparatus is to serve more than one purpose.

Another object of the vehicle trailer apparatus is to combine the advantages of a trailer with those of a tilt bed vehicle.

An added object of the vehicle trailer apparatus is to provide incline and decline of the tilt bed relative to the front bed.

And, an object of the vehicle trailer apparatus is to provide for no gap or elevation change of the bed platforms at the juncture of the front bed and tilt bed.

A further object of the vehicle trailer apparatus is to provide the combined advantages of a tilt bed apparatus and a trailer without the need to uncouple one from the other.

Still another object of the vehicle trailer apparatus is to provide access to the underside of a loaded vehicle or object.

These together with additional objects, features and advantages of the improved vehicle trailer apparatus will be readily apparent to those of ordinary skill in the art upon reading the following detailed description of presently preferred, but nonetheless illustrative, embodiments of the improved vehicle trailer apparatus when taken in conjunction with the accompanying drawings.

In this respect, before explaining the current embodiments of the improved vehicle trailer apparatus in detail, it is to be understood that the vehicle trailer apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved vehicle trailer apparatus. It is therefore important that the claims be regarded as including such equivalent constructions insofar as they do not depart from the spirit and scope of the vehicle trailer apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the vehicle trailer apparatus generally designated by the reference number 10 will be described.

Figure 1:
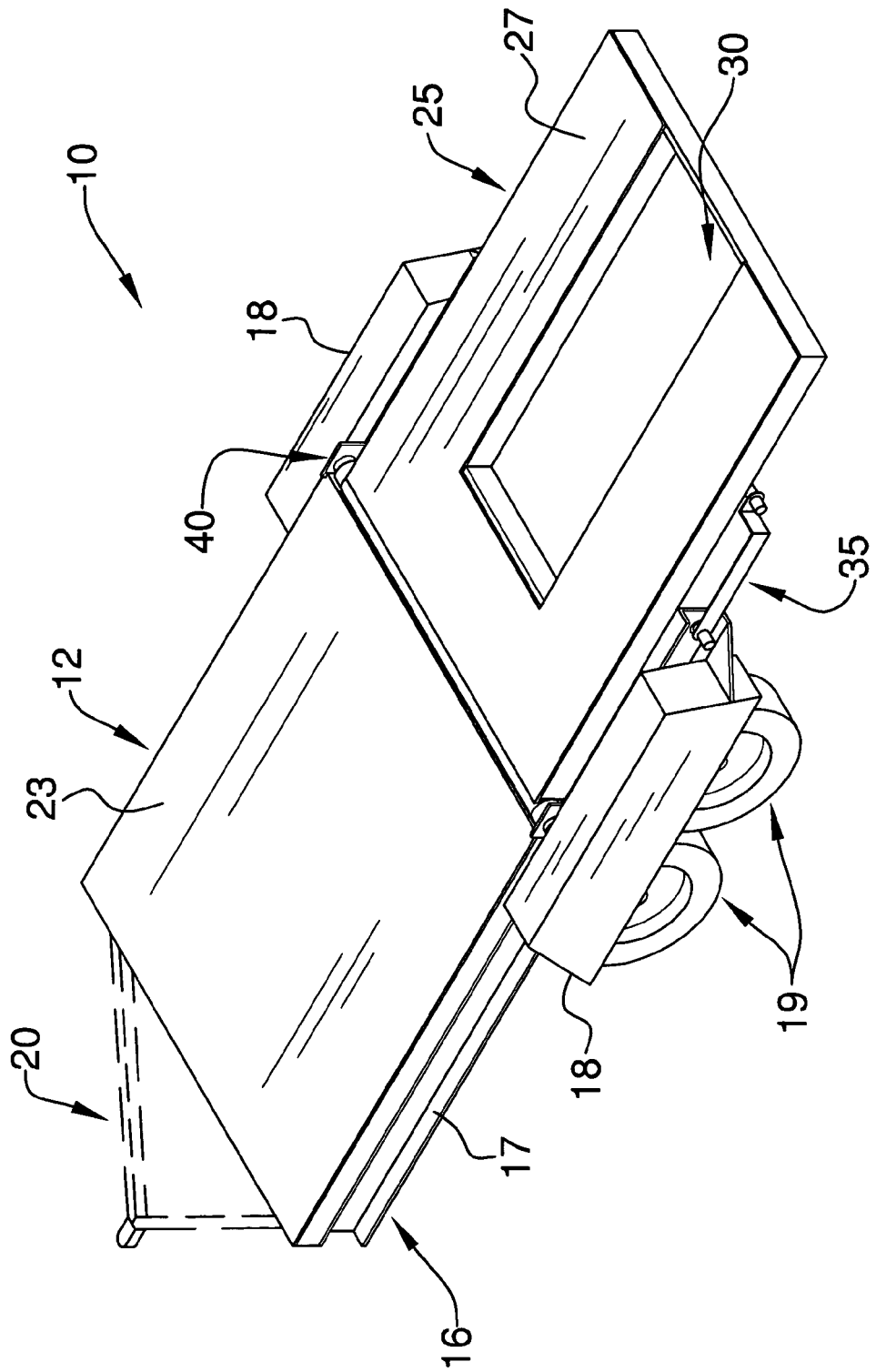
FIG. 1 is a perspective view.
Figure 2:
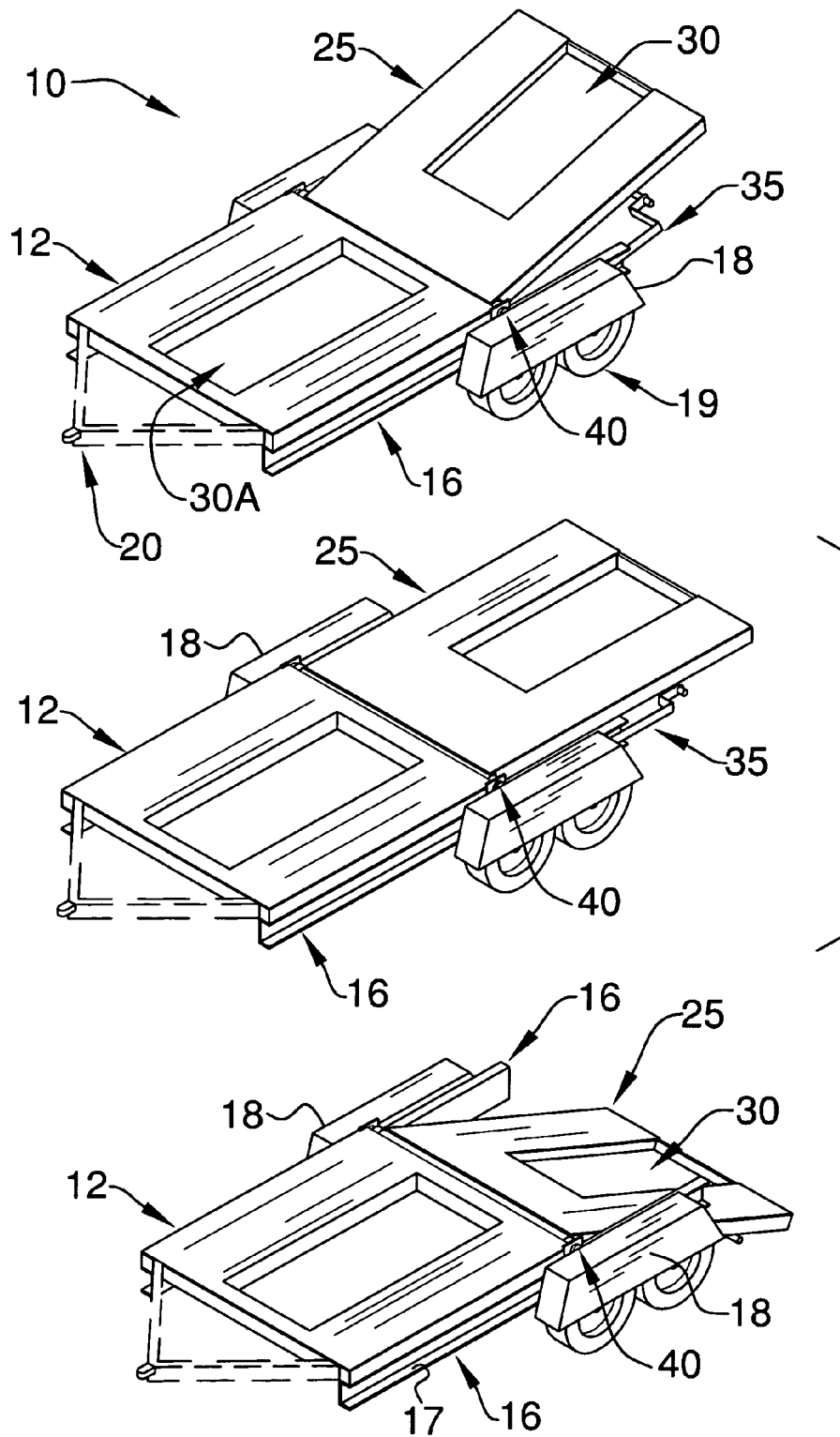
FIG. 2 is a perspective view in triplicate, illustrating tilt bed incline, level, and decline relative to the front bed.
Figure 3:
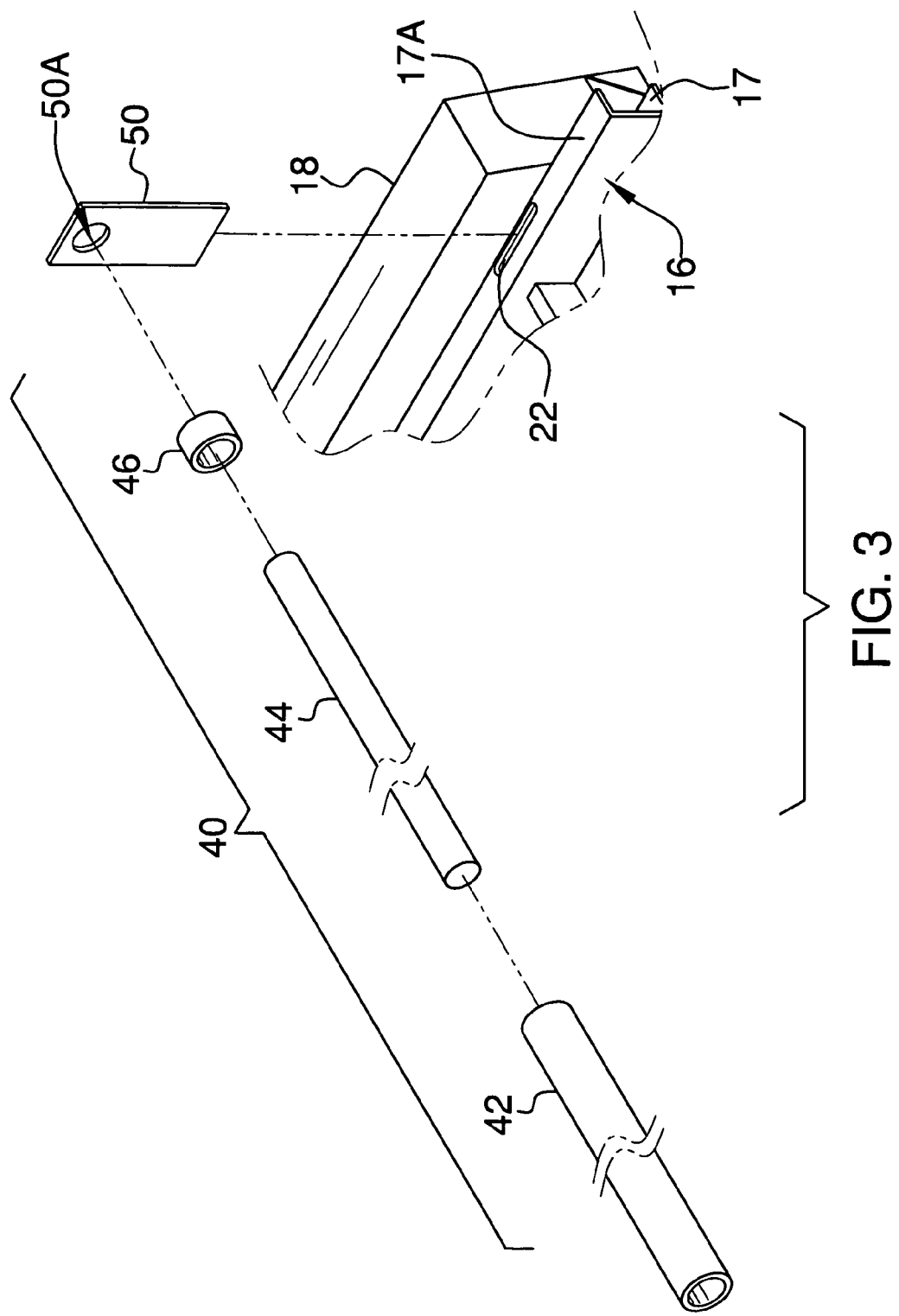
FIG. 3 is an exploded perspective view of the hinge components.
Figure 4:
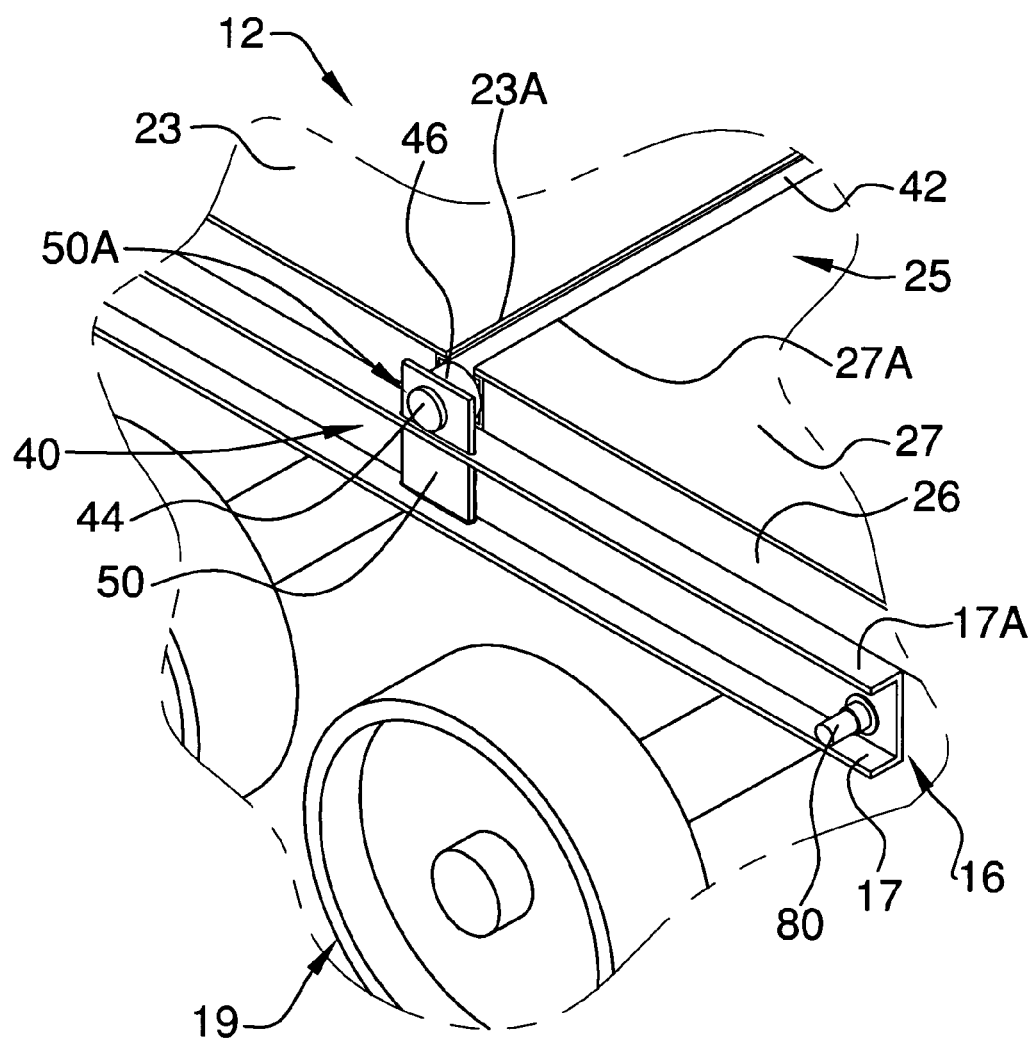
FIG. 4 is a perspective view of the installed hinge components.

Referring to FIGS. 1 and 2, the vehicle trailer apparatus 10 provides for carrying vehicles or other objects benefiting from the advantages of the apparatus 10. The apparatus 10 comprises a front bed platform 23 over the entire front bed 12 in FIG. 1. FIG. 2 illustrates a front bed platform 23 with front opening 30a in order to represent that the front bed platform 23 is not limited in configuration. The tongue with hitch 20 is provided in various embodiments that are typical of tongues and trailer hitches in the art. The tongue with hitch 20 is only an illustration of one type optionally available. The two sets of spaced apart wheels 19 are affixed to the frame rails 16. The number of sets of spaced apart wheels 19 is not limited to one or to any given multiple of sets of wheels 19. Wheels 19 can be mounted to the frame rails 16 and axle 21 via any number of suspension types (not shown), including but not limited to leaf springs and coil springs. Fenders 18 are optionally provided for partially covering wheels 19. The tilt bed 25 inclines and declines at least about 40 degrees relative to the front bed 12. Depending upon the apparatus 10 length and upon load factors, the tilt bed 25 is capable of inclining a full 90 degrees. The tilt bed platform 27 optionally provides the opening 30. Opening 30 provides access to the underside of a vehicle or object upon the apparatus 10. Further, by inclining the tilt bed 25, the underside of a vehicle can be accessed in a standing or near standing position.

Figure 5:
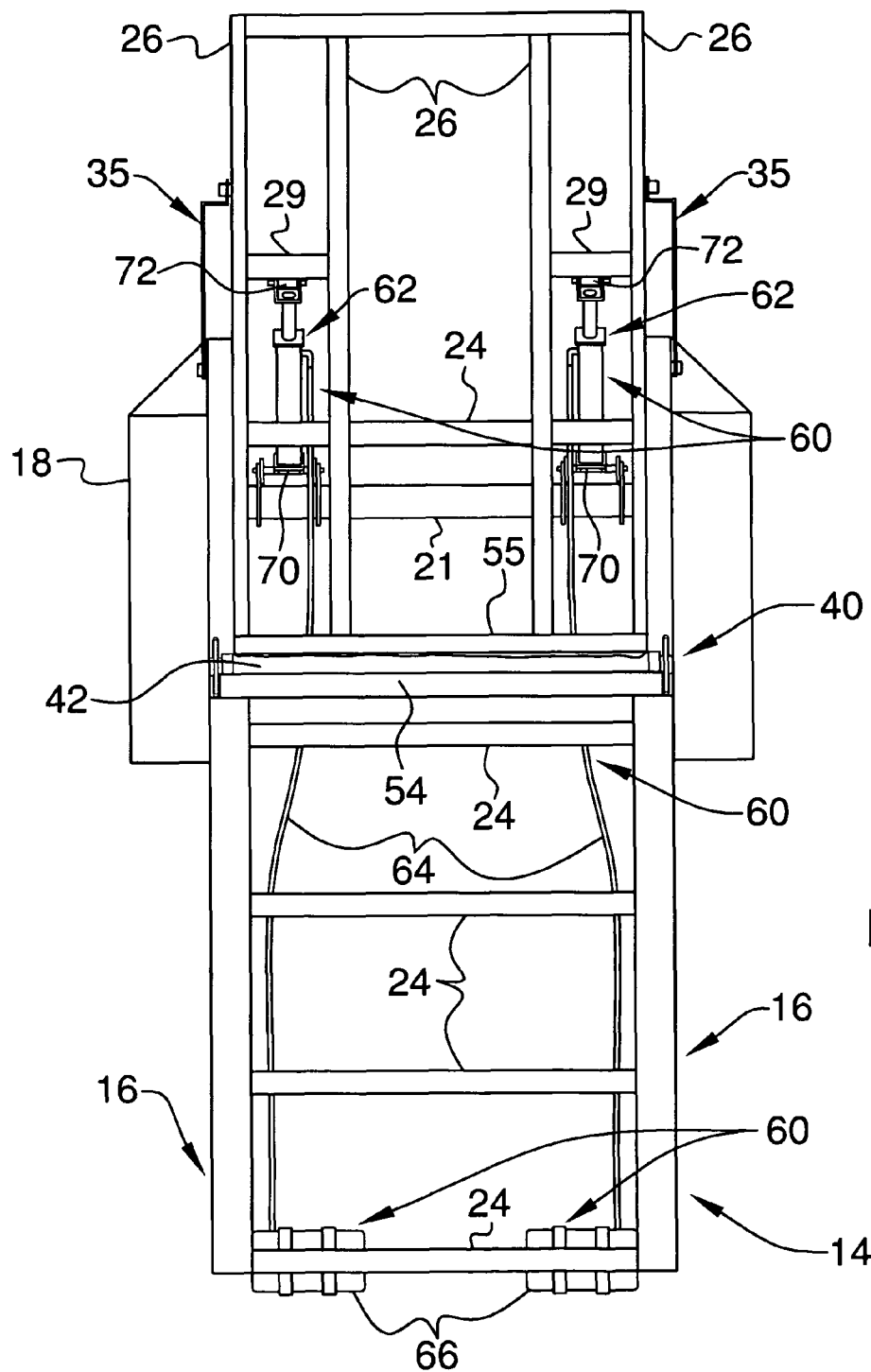
FIG. 5 is a top plan view without front bed platform and tilt bed platform.
Figure 6:
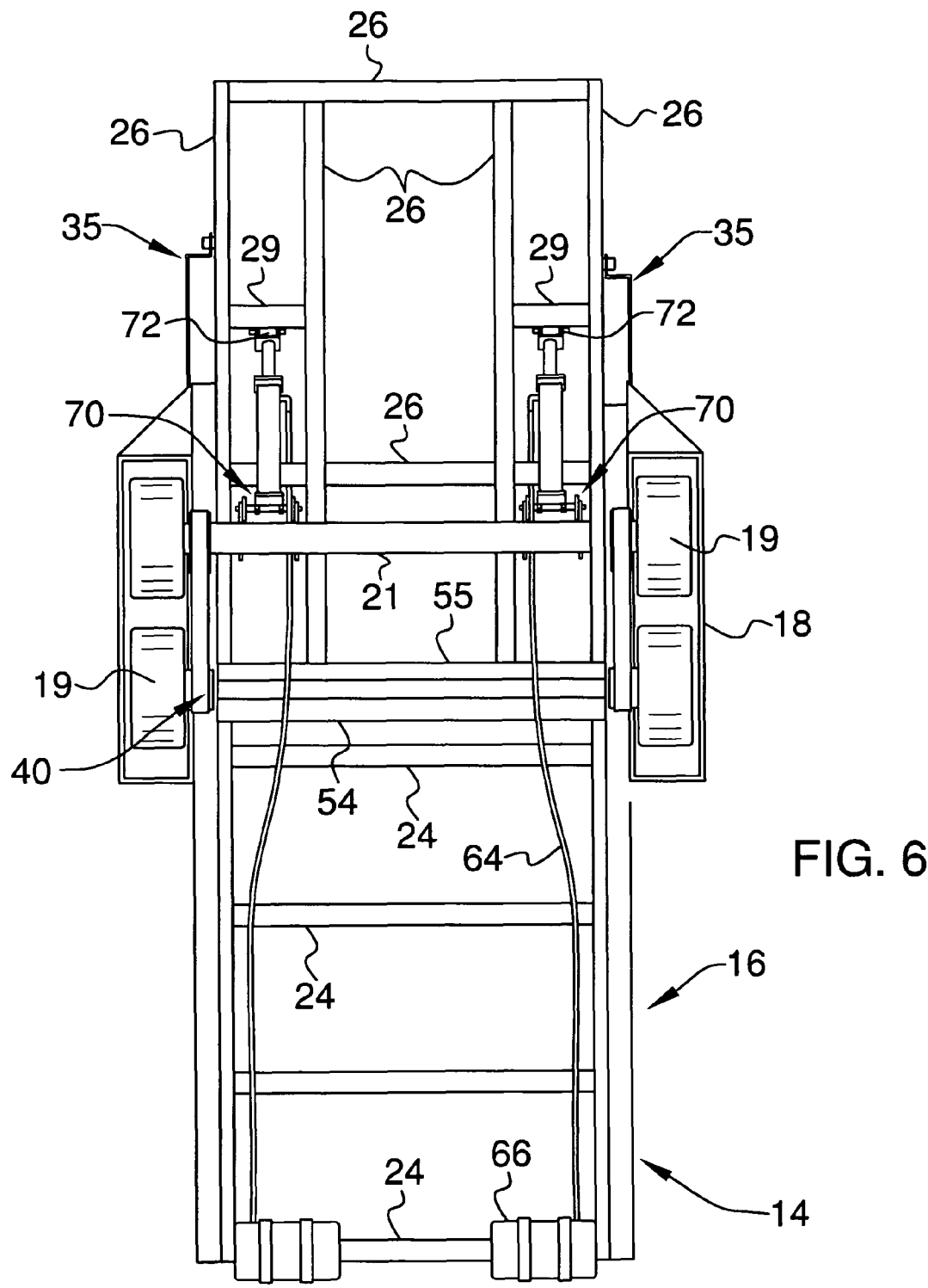
FIG. 6 is a bottom plan view without front bed platform and tilt bed platform.

Referring to FIGS. 3-6, and again to FIGS. 1 and 2, the front bed 15 has a frame 14 comprised of a pair of spaced apart frame rails 16 connected by the plurality of transverse supports 24. In FIGS. 5 and 6, the front bed platform 23 and tilt bed platform 27 are removed to fully disclose the frame 14 features and the tilt bed 25 features. The rear tilt bed 25 has a plurality of spaced apart bed rails 26. The tilt bed platform 27 is affixed over the tilt bed 25 bed rails 26. The tilt bed 25 is attached to the front bed 12 via the hinge 40. Each spaced apart frame rail 16 of the front bed 12 further comprises a lower rail web 17 and an upper rail web 17a. A web cutout 22 is disposed in the upper rail web 17a. The mount bracket 50 is affixed through the web cutout 22 and fully to the frame rail 16 including lower rail web 17. The mount bracket hole 50a is disposed in the upper end of the mount bracket 50. The hinge pin 44 is freely disposed within the pair of bushings 46. Each bushing 46 is affixed to one of the pair of spaced apart mount brackets 50, respectively, in alignment with each mount bracket hole 50a. The hinge pin 44 is freely housed within the sleeve 42 and the bushings 46. The sleeve 42 is attached to the second member 55 which is affixed to the tilt bed 25 bed rails 26. The first member 54 of the frame 14 of the front bed 12 is disposed immediately adjacent to but not attached to the sleeve 42. The tilt bed platform 27 and the front bed platform 23 are affixed at the same height as the top of the sleeve 42. The location and design of the hinge 40, the height of the sleeve 42 and the front bed platform 23 and the tilt bed platform 27 negate any gap no matter the incline or decline of the tilt bed 25.

The apparatus 10 provides rear tilt bed 25 incline and decline without an elevation change between the front bed platform 23 rear edge 23a and tilt bed platform 27 front edge 27a. The tilt bed 25 is selectively pivoted in incline or decline relative to the front bed 12 by the hydraulic system 60. The hydraulic system 60 varies in number of components with each apparatus 10 embodiment. In the illustrated embodiment, the hydraulic system 60 comprises two hydraulic cylinders 62. A pivotal mount first end 70 of each hydraulic cylinder 62 is attached to a crossmember 32 positioned directly above the axle 21 and attached to the axle 21. A pivotal mount second end 72 of each hydraulic cylinder 62 is attached to a transverse 29 of the tilt bed 25. The hydraulic cylinders 62 may optionally be powered by hydraulics of a pulling vehicle. The hydraulic cylinders 62 of the illustrated embodiment comprise their own power via a pump 66 for each which communicates through feed lines 64.

Figure 7:
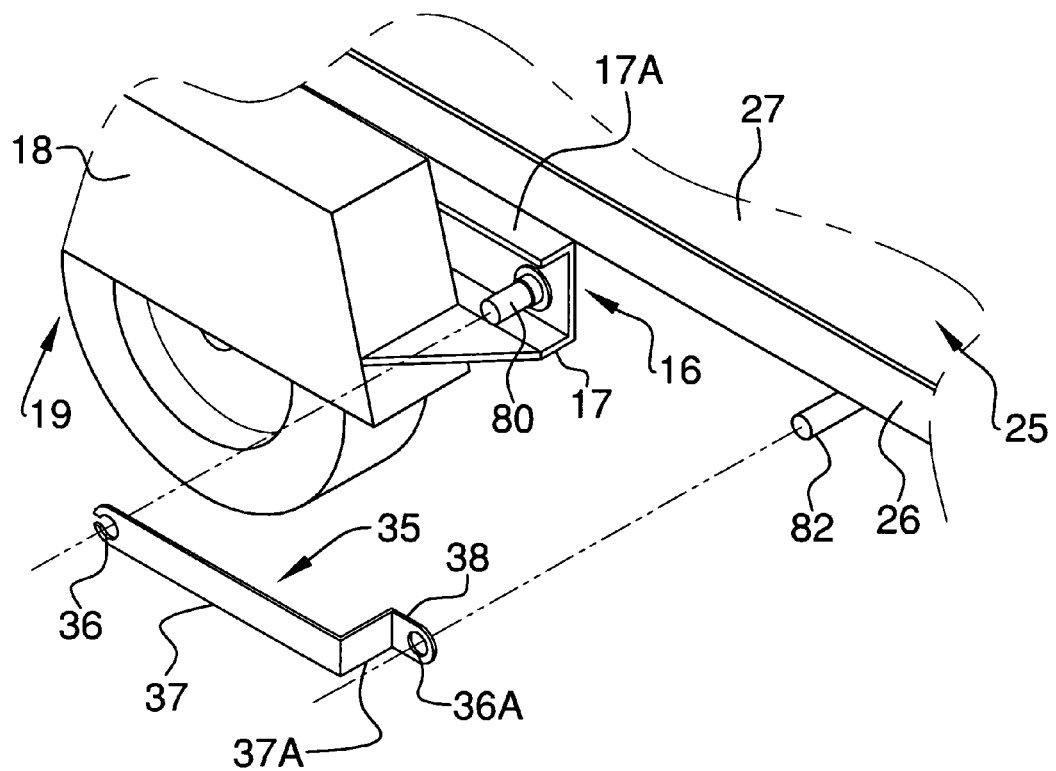
FIG. 7 is a perspective view of the safety latch and related first support pin and second support pin.

Referring to FIG. 7, the tilt bed 25 and front bed frame 14 further comprise a removable safety latch 35 to selectively ensure the incline or level position of the tilt bed 25 relative to the front bed 12. The frame rails 16 of the front bed 12 are each affixed with a first support pin 80. Each corresponding bed rail 26 of the tilt bed 25 is affixed with a second support pin 82. The slideably removable safety latch 35 comprises the support arm 37 with first latch orifice 36. The instep 37a is affixed to the support arm 37 end opposite the first latch orifice 36. The extension 38 is affixed to the instep 37a at a right angle, and is further comprised of the second latch orifice 36a.

The geometry of the tilt bed 25 relative to frame rails 16 provides for the safety latch 35 to selectively ensure the level position of the tilt bed 25 relative to the front bed 12, so that, even were the hydraulic system 60 to fail, the apparatus 10 would not be a danger to anyone when in use. Further, the noted geometry provides for the safety latch 35 to also hold the tilt bed 25 in an inclined position. Traversing the tilt bed 25 between level and inclined positions requires removal of the safety latch 35.

With respect to the above description then, it is to be realized that the optimum dimensional relationships for the parts of the vehicle trailer apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the vehicle trailer apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the vehicle trailer apparatus may be used.

Therefore, the foregoing is considered as illustrative only of the principles of the vehicle trailer apparatus. Further, since numerous modifications and changes will readily occur to those skilled in the art, it is not desired to limit the vehicle trailer apparatus to the exact construction and operation shown and described, and accordingly, all suitable modifications and equivalents may be resorted to, falling within the scope of the vehicle trailer apparatus.

What is claimed is:

1. A vehicle trailer apparatus for carrying vehicles, comprising, in combination:
   a front bed having a frame comprised of a pair of spaced apart frame rails connected by at least one transverse support, each spaced apart frame rail further comprising;
   a lower rail web;
   an upper rail web;
   a web cutout disposed in the upper rail web;
   a mount bracket affixed through the web cutout and to the frame rail and the lower rail web;
   a mount bracket hole disposed upwardly in the mount bracket;
   a tongue with hitch affixed to the front bed frame;
   at least two spaced apart wheels affixed to the frame via an axle;
   a front bed platform over at least a part of the front bed;
   a rear tilt bed having a plurality of spaced apart bed rails;
   a hinge connecting the front bed to the tilt bed, the hinge further comprising:
      a hinge pin freely disposed within a pair of bushings, each bushing affixed to one of the mount brackets, respectively, the hinge pin freely housed within a sleeve, the sleeve attached to a second member affixed to the tilt bed, whereby adjacent positions of a front bed platform rear edge and a tilt bed platform front edge are retained in incline and decline of the tilt bed;
   whereby the tilt bed is selectively pivoted in incline and decline relative to the front bed by a hydraulic system;
   whereby no elevation differential exists between the front platform rear edge and the tilt bed platform front edge in incline or decline of the tilt bed;
   a tilt bed platform over at least a part of the tilt bed;
   a removable safety latch to secure positioning of the tilt bed relative to the front bed.

2. The apparatus according to claim 1 wherein the tilt bed further inclines and declines at least about 40 degrees relative to the front bed.

3. The apparatus according to claim 2 wherein the hydraulic system further comprises at least one hydraulic cylinder, a pivotal mount first end of the hydraulic cylinder attached to a crossmember positioned directly above the axle and attached to the axle, a pivotal mount second end of the hydraulic cylinder attached to a transverse of the tilt bed;
   means for powering each hydraulic cylinder.

* * * * *